United States Patent
Bui

(10) Patent No.: US 10,758,761 B1
(45) Date of Patent: Sep. 1, 2020

(54) METHOD FOR LIQUID NARCOTIC MEDICATION VALIDATION AND DEACTIVATION

(71) Applicant: Phong Duy Bui, San Diego, CA (US)

(72) Inventor: Phong Duy Bui, San Diego, CA (US)

( * ) Notice: Subject to any disclaimer, the term of this patent is extended or adjusted under 35 U.S.C. 154(b) by 0 days.

(21) Appl. No.: 16/871,486

(22) Filed: May 11, 2020

Related U.S. Application Data

(62) Division of application No. 16/540,341, filed on Aug. 14, 2019, now Pat. No. 10,653,911.

(51) Int. Cl.
*A62D 3/30* (2007.01)
*G01N 21/78* (2006.01)
*G01N 21/77* (2006.01)

(52) U.S. Cl.
CPC .............. *A62D 3/30* (2013.01); *G01N 21/78* (2013.01); *G01N 2021/7759* (2013.01)

(58) Field of Classification Search
CPC ... A62D 3/30; G01N 21/78; G01N 2021/7759
USPC .......................................................... 588/313
See application file for complete search history.

(56) References Cited

U.S. PATENT DOCUMENTS

| | | |
|---|---|---|
| 5,334,178 A | 8/1994 | Haber et al. |
| 7,838,715 B2 | 11/2010 | Uhland et al. |
| 8,236,238 B2 | 8/2012 | Uhland et al. |
| 8,490,795 B2 | 7/2013 | Ziemba |
| 8,642,830 B2 | 2/2014 | Uhland et al. |
| 9,005,098 B2 | 4/2015 | Ziemba |
| 9,046,403 B2 | 6/2015 | Ortenzi et al. |
| 9,403,197 B2 | 8/2016 | Dallas et al. |
| 2009/0180936 A1 | 7/2009 | Anderson et al. |
| 2010/0258565 A1 | 10/2010 | Isaacson et al. |
| 2015/0352389 A1 | 12/2015 | Fowler et al. |

*Primary Examiner* — Edward M Johnson
(74) *Attorney, Agent, or Firm* — James R McDaniel

(57) ABSTRACT

A system and method for the validation and deactivation of liquid narcotic medications. The system includes a two (2) compartment assembly having a first compartment, wherein the liquid narcotic medications are tested to determine (or validate) the composition of the liquid narcotic medication and a second compartment operatively connected to the first compartment, wherein the liquid narcotic medications can be deactivated, if necessary.

7 Claims, 3 Drawing Sheets

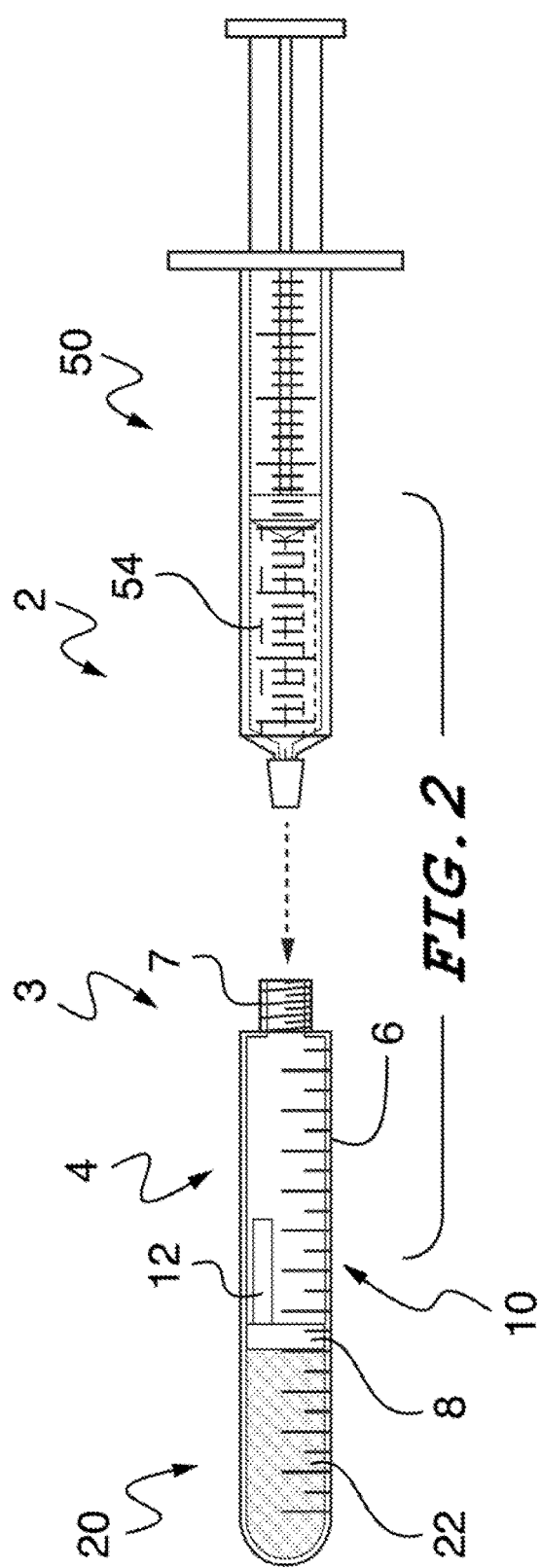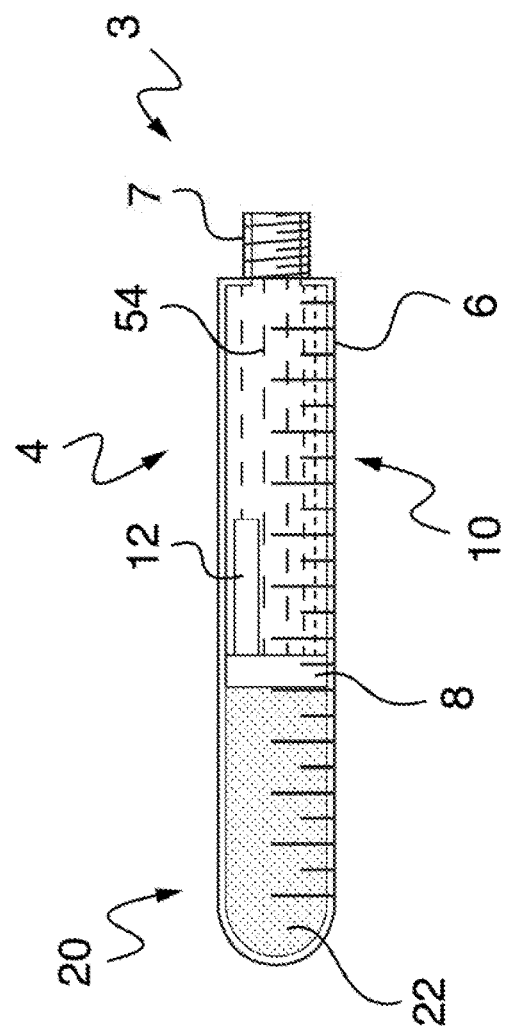

METHOD FOR LIQUID NARCOTIC MEDICATION VALIDATION AND DEACTIVATION

FIELD OF THE INVENTION

The present invention is generally related to a system and method for the validation and deactivation of liquid narcotic medications. The system includes a two (2) compartment assembly having a first compartment wherein the liquid narcotic medications are tested to determine (or validate) the composition of the liquid narcotic medication and a second compartment operatively connected to the first compartment wherein the liquid narcotic medications can be deactivated, if necessary. In this manner, the end user can easily determine the composition of the liquid narcotic medications that are scheduled to be wasted (disposed of). If it is determined that the remaining liquid narcotic that was scheduled to be wasted was the liquid narcotic medication that should have been wasted, the liquid narcotic medication that was tested (validated) in the first compartment is then transferred to the second compartment where the liquid narcotic medication is then deactivated. If it is determined that the remaining liquid that was scheduled to be wasted was not what should have been wasted, the proper authorities are then notified as to the fact that the remaining liquid narcotic that should have been wasted was not what is actually being wasted so that further procedural, personnel and/or legal actions can be taken.

BACKGROUND OF THE INVENTION

Prior to the present invention, as set forth in general terms above and more specifically below, it is known, to employ various types of devices for the deactivation of medications. See for example, U.S. Pat. No. 5,334,178 by Haber et al., U.S. Pat. No. 7,838,715 by Uhland et al., U.S. Pat. No. 8,236,238 by Uhland et al., U.S. Pat. No. 8,490,795 by Ziemba, U.S. Pat. No. 8,642,830 by Uhland et al., U.S. Pat. No. 9,005,098 by Ziemba, U.S. Pat. No. 9,046,403 by Ortenzi et al., U.S. Pat. No. 9,403,197 by Dallas et al., U.S. Patent Application 2009/0180936 by Anderson et al., U.S. Patent Application 2010/0258565 by Isaacson et al., and U.S. Patent Application 2015/0352389 by Fowler et al. While these various devices for the deactivation of medications may have been generally satisfactory, there is nevertheless a need for a new and improved apparatus and method for the validation and deactivation of liquid narcotic medications, wherein the device is capable of detecting the possible theft or misuse of liquid narcotic medications.

It is a purpose of this invention to fulfill these and other needs in the liquid narcotic medication validation and deactivation art in a manner more apparent to the skilled artisan once given the following disclosure.

BRIEF SUMMARY OF THE INVENTION

A first aspect of the present invention is a system for validating and deactivating liquid medications to be wasted, including a liquid medication validation and deactivation container having a first end and a second end; a rupturable membrane attached to an inside of the liquid medication validation and deactivation container, a liquid medication deactivation compartment located within the liquid medication validation and deactivation container such that the liquid medication deactivation compartment is located between the first end of the liquid validation and deactivation container and a first side of the membrane; a liquid medication validation compartment located within the liquid medication validation and deactivation container such that the liquid medication validation compartment is located between the second end of the liquid validation and deactivation container and a second side of the membrane; at least one liquid medication indicator located within the liquid medication validation compartment, wherein the at least one liquid medication indicator is used to determine a chemical compound of a liquid medication that is introduced into the liquid medication validation compartment; and a one-way valve operatively connected to the second end of the liquid medication validation and deactivation container.

In one embodiment of the first aspect of the present invention, the membrane further includes a rupturable, UV resistant, and chemical resistant material.

In another embodiment of the first aspect of the present invention, the liquid medication deactivation compartment includes an amount of a liquid medication deactivation compound which is capable of deactivating the liquid medication thereby rendering the liquid medication inert.

In still another embodiment of the first aspect of the present invention, the liquid medication validation compartment further includes a plurality of markings located along a length of the liquid medication validation and deactivation container and along the liquid medication validation compartment to provide an indication as to the amount of liquid medication that has been introduced into the liquid medication validation compartment.

In a further embodiment of the first aspect of the present invention, the system further includes a syringe such that the syringe contains an amount of a liquid medication to be validated and deactivated, wherein the syringe is used to introduce the liquid medication into the liquid medication validation compartment through the one-way valve.

In a still further embodiment of the first aspect of the present invention, the one-way valve further includes a one-way luer valve.

In an even further embodiment of the first aspect of the present invention, the at least one liquid medication indicator further includes a litmus test strip.

A second aspect of the present invention is a method for validating and deactivating liquid medications to be wasted, including the steps of: providing a liquid medication validation and deactivation device, wherein the liquid medication validation and deactivation device includes: a liquid medication validation and deactivation container having a first end and a second end; a rupturable membrane attached to an inside of the liquid medication validation and deactivation container; a liquid medication deactivation compartment located within the liquid medication validation and deactivation container such that the liquid medication deactivation compartment is located between the first end of the liquid validation and deactivation container and a first side of the membrane; a liquid medication validation compartment located within the liquid medication validation and deactivation container such that the liquid medication validation compartment is located between the second end of the liquid validation and deactivation container and a second side of the membrane; at least one liquid medication indicator located within the liquid medication validation compartment, wherein the at least one liquid medication indicator is used to determine a chemical compound of a liquid medication that is introduced into the liquid medication validation compartment; and a one-way valve operatively connected to the second end of the liquid medication validation and deactivation container; introducing an amount of a liquid medication to be wasted through the one-way valve into the liquid medication validation compartment, wherein the liquid medication to be wasted includes a known chemical composition; validating a chemical composition of the liquid medication to be wasted in the liquid medication validation compartment, wherein 1.) if it is determined that the liquid medication that was validated in the liquid medication validation compartment has the same chemical composition as the known composition of the liquid medication to be wasted then the liquid medication that was validated in the liquid medication validation compartment is transferred through the membrane to the liquid medication deactivation compartment where the liquid medication to be wasted is deactivated by rendering the liquid medication inert or 2.) if it is determined that the liquid medication that was validated in the liquid medication validation compartment does not have the same chemical composition as the known composition of the liquid medication to be wasted then the liquid medication that was validated in the liquid medication validation compartment is retained in the liquid medication validation compartment for further investigation to determine the discrepancy between the chemical composition of the liquid medication that was validated in the liquid medication validation compartment and the known composition of the liquid medication to be wasted.

In another embodiment of the second aspect of the present invention, the step of providing a liquid medication validation and deactivation device further includes the step of providing a rupturable, UV resistant, and chemical resistant material.

In still another embodiment of the second aspect of the present invention, the step of providing a liquid medication validation and deactivation device further includes the step of providing an amount of a liquid medication deactivation compound in the liquid medication deactivation compartment which is capable of deactivating the liquid medication thereby rendering the liquid medication inert.

In a yet another embodiment of the second aspect of the present invention, the step of providing a liquid medication validation and deactivation device further includes the step of providing a plurality of markings located along a length of the liquid medication validation and deactivation container and along the liquid medication validation compartment to provide an indication as to the amount of liquid medication that has been introduced into the liquid medication validation compartment.

In a further embodiment of the second aspect of the present invention, the step of providing a liquid medication validation and deactivation device further includes the step of providing a syringe such that the syringe contains an amount of a liquid medication to be validated and deactivated, wherein the syringe is used to introduce the liquid medication into the liquid medication validation compartment through the one-way valve.

In still further embodiment of the second aspect of the present invention, the one-way valve further includes providing a one-way luer valve.

In a yet further embodiment of the second aspect of the present invention, the at least one liquid medication indicator further includes a litmus strip.

A third aspect of the present invention is an apparatus for determining a chemical composition of a liquid opioid medication to be wasted by validating the chemical composition of the liquid opioid medication and deactivating the liquid opioid medication, including a liquid medication validation and deactivation container having a first end and a second end; a rupturable membrane attached to an inside of the liquid medication validation and deactivation container; a liquid medication deactivation compartment located within the liquid medication validation and deactivation container such that the liquid medication deactivation compartment is located between the first end of the liquid validation and deactivation container and a first side of the membrane; a liquid medication validation compartment located within the liquid medication validation and deactivation container such that the liquid medication validation compartment is located between the second end of the liquid validation and deactivation container and a second side of the membrane; at least one liquid medication indicator located within the liquid medication validation compartment, wherein the at least one liquid medication indicator is used to determine a chemical compound of a liquid medication that is introduced into the liquid medication validation compartment; and a one-way valve operatively connected to the second end of the liquid medication validation and deactivation container.

In one embodiment of the third aspect of the present invention, the membrane further includes a rupturable, UV resistant, and chemical resistant material.

In another embodiment of the third aspect of the present invention, the liquid medication deactivation compartment includes an amount of a liquid medication deactivation compound which is capable of deactivating the liquid medication thereby rendering the liquid medication inert.

In still another embodiment of the third aspect of the present invention, the liquid medication validation compartment further includes a plurality of markings located along a length of the liquid medication validation and deactivation container and along the liquid medication validation compartment to provide an indication as to the amount of liquid medication that has been introduced into the liquid medication validation compartment.

In a further embodiment of the third aspect of the present invention, the one-way valve further includes a one-way luer valve.

In an even further embodiment of the third aspect of the present invention, the at least one liquid medication indicator further includes a litmus test strip.

The preferred apparatus and method for the validation and deactivation of liquid narcotic medications, according to various embodiments of the present invention, offers the following advantages: ease of use; lightness in weight; portability; reliability; repeatability of the validation process; ease of proper disposal of the device; the ability to test (validate) a sample of the type of liquid narcotic medication that was to be wasted; the ability to determine the chemical composition of the sample of the type of liquid narcotic medication that was to be wasted; the ability to deactivate the tested sample; and the ability to inform the proper authorities as to the chemical composition of the sample of the type of liquid narcotic medication that was to be wasted. In fact, in many of the preferred embodiments, these advantages are optimized to an extent that is considerably higher than heretofore achieved in prior, known methods and apparatus for the deactivation of liquid narcotic medications.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 2 is a schematic illustration of the apparatus for the validation and deactivation of liquid narcotic medications being used in conjunction with a liquid medication dispensing syringe;

FIG. 3 is a schematic illustration of the apparatus for the validation and deactivation of liquid narcotic medications, wherein the liquid narcotic to be wasted has been introduced into the first compartment of the apparatus for the validation and deactivation of liquid narcotic medications.

DETAILED DESCRIPTION OF THE PREFERRED EMBODIMENTS OF THE INVENTION

It is known that before various medical procedures or surgeries are performed, an anesthesiologist or nurse will conventionally withdraw various drugs including narcotics (opioids) for pain control from a conventional medication dispensing unit. Furthermore, any amount of the narcotics not administered to the patient during the medical procedure must be properly disposed of (commonly referred to as "wasted") in a dedicated bin and witnessed by a second authorized person which is usually a registered nurse, as required by various Federal, State and/or local government regulations. The amount of wasted narcotics must equal the amount of narcotics that were withdrawn from the dispensing unit minus the amount of narcotics that were administered to the patient during the medical procedure or surgery.

However, it has been determined that a serious problem with this well-known method is that the witnessing party is solely relying on the good faith assumption that the medication being wasted is the medication that the disposing party claims they are wasting. Unfortunately, this creates a serious loophole in the system especially where theft is prevalent. In particular, since most liquid narcotics such as liquid opioids are clear, a narcotic administering anesthesiologist or nurse can easily swap out the liquid narcotic syringes with a pre-filled saline or water syringe that the administering anesthesiologist or nurse had surreptitiously hidden in a pocket of their surgical gown. The nefarious narcotic administering anesthesiologist or nurse could then keep the narcotics that were supposed to be wasted for themselves.

In order to address the shortcomings of the prior, known liquid narcotic wasting systems and methods, it would be desirable to utilize a system and method of validating that the liquid narcotic to be wasted is actually the liquid narcotic that was supposed to be wasted after the conclusion of the medical procedure or surgery in order to deter theft of the liquid narcotic to be wasted. Furthermore, it would be desirable if the system and method of validating the liquid narcotic could also deactivate the liquid narcotic after it has been validated, thereby making the liquid narcotic inert which would further deter theft from the disposing bin. Finally, it would be desirable if the system and method that causes the liquid narcotic to become inert is environmentally safe so that the hospital or medical facility can avoid sending the deactivated narcotic waste to a conventional incineration facility.

Figure 1:
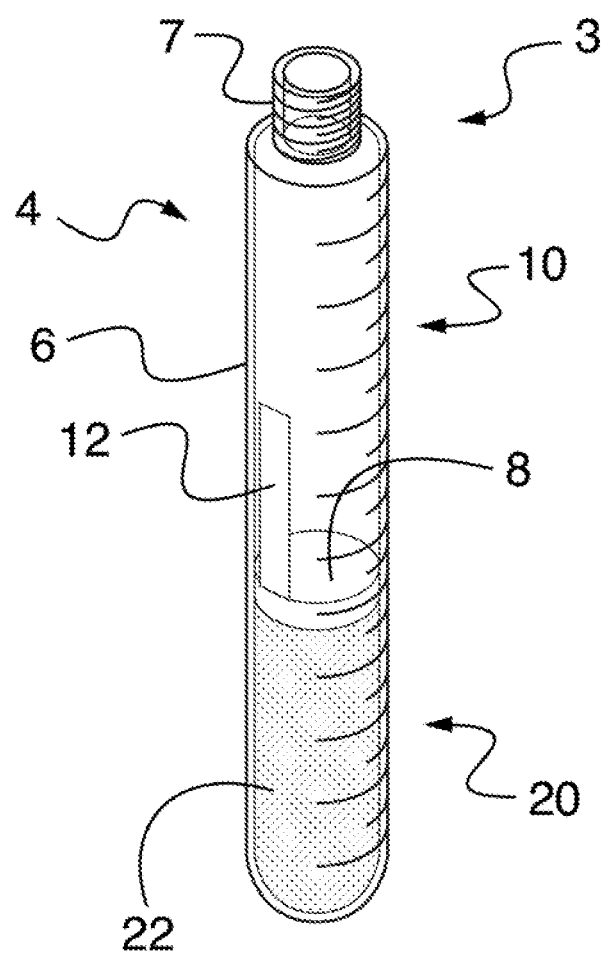
FIG. 1 is a schematic illustration of an apparatus for the validation and deactivation of liquid narcotic medications, constructed according the present invention.
Figure 4:
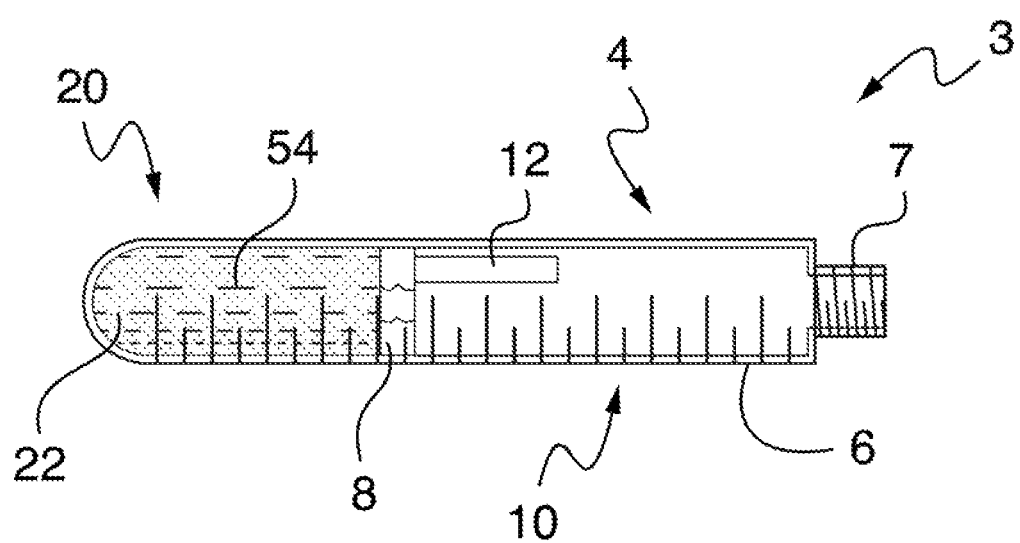
FIG. 4 is a schematic illustration of the apparatus for the validation and deactivation of liquid narcotic medications, wherein the liquid narcotic to be wasted has been introduced into the second compartment of the apparatus for the validation and deactivation of liquid narcotic medications.

Reference is made now to FIGS. 1-4, where there is illustrated a liquid narcotic (opioid) validation and deactivation system 2, wherein the system includes a two (2) compartment assembly 3 having a first compartment 4, wherein the liquid narcotic medications are tested to determine (or validate) the nature (chemical composition) of the liquid narcotic medication and a second compartment 20 operatively connected to the first compartment 4, wherein the liquid narcotic medications can then be deactivated, if necessary. In this manner, the end user can easily determine the composition of the liquid narcotic medications that are to be wasted after having been administered to a patient during a medical procedure. If it is determined that the remaining liquid narcotic (the liquid narcotic to be wasted) that was administered to the patient during the medical procedure was the liquid narcotic medication that should have been wasted, the liquid narcotic medication that was tested in the first compartment 4 is then transferred to the second compartment 20 where the liquid narcotic medication is then deactivated. If it is determined that the remaining liquid that should was to be wasted was not what should have been wasted, the proper authorities are then notified so that further procedural, personnel and/or legal actions can be taken.

As shown in FIG. 1-4, there is illustrated liquid narcotic (opioid) validation and deactivation system 2. Liquid narcotic (opioid) validation and deactivation system 2 includes, in part, liquid narcotic (opioid) validation and deactivation device 3 and conventional syringe 50. It is to be understood that syringe 50 contains a liquid narcotic medication 54 that is to be wasted, wherein the liquid narcotic medication 54 is to be validated and, possibly, deactivated, by the liquid narcotic (opioid) validation and deactivation device 3, as will be described in greater later.

With respect to liquid narcotic (opioid) validation and deactivation device 3, liquid narcotic (opioid) validation and deactivation device 3 includes, in part, first compartment 4, compartments container 6, one-way valve (or seal) 7, membrane 8, conventional markings or graduations 10, liquid narcotic (opioid) validation strips or indicators 12, second compartment 20, and liquid narcotic (opioid) deactivation compound 22. Preferably, compartments container 6 is constructed of any suitable, durable, chemical resistant, heat proof, unbreakable, clear, and UV resistant material. Also, compartments container 6 should be constructed so that compartments 4 and 20 can be located within compartments container 6. It is to be understood that conventional markings or graduations 10 can be conventionally placed on compartments container 6 so as to provide an indication as to the amount of liquid narcotic (opioid) that have been placed within the first compartment 4. In this manner, the end user can quickly and easily determine if the amount of liquid narcotics (opioids) that have been introduced from the syringe 50 into the first compartment 4 substantially equals the amount of liquid narcotics (opioids) that are located within the first compartment 4.

A unique aspect of the present invention is the use of one-way valve (or seal) 7. In particular, one-way valve (or seal) 7 is attached to one end of compartments container 6 at an upper end of first compartment 4. Preferably, one-way valve (or seal) 7 is a conventional one-way valve such as a 1-way luer lock that will allow the end user to introduce the liquid narcotic (opioid) 54 to be validated from the syringe 50 into the first compartment 4, as will be discussed in greater detail later. In this manner, the one-way valve (or seal) 7 will allow the liquid narcotic (opioid) 54 to be introduced into the first compartment 4 but will not allow the liquid narcotic (opioid) 54 to be removed from the first compartment 4. It is to be understood that syringe 50 should not be equipped with a needle. In this manner, syringe 50 can simply be used to introduce the liquid narcotic (opioid) 54 into the first compartment by inserting the end of syringe 50 into the one-way valve (or seal) 7. Furthermore, with the needle being removed from the end of syringe 50, the likelihood of the user being inadvertently stuck with the needle is eliminated.

Another unique aspect of the present invention is the use of membrane (divider) 8. Preferably, membrane 8 is constructed of any suitable, rupturable, UV resistant, and chemical resistant material. However, it is to be understood that membrane 8 can also be a one-way door or any other similar device that can open and close in order to allow the liquid narcotic (opioid) 54 to be introduced into the second compartment 20 but does not allow the liquid narcotic (opioid) 54 and/or the liquid narcotic (opioid) deactivation compound 22 to leave the second compartment 20. Also, membrane 8 is secured to the inside of compartments container 6 so that the liquid narcotic (opioid) deactivation compound 22 is separated from the first compartment 4 until it is desired to introduce the liquid narcotic (opioid) 54 into the second compartment 20 so that the liquid narcotic (opioid) 54 can be deactivated by the liquid narcotic (opioid) deactivation compound 22, as will be discussed in greater detail later. An important factor in the construction of membrane 8 being that the membrane 8 can be quickly and easily pierced or ruptured by the end user so that the liquid narcotic (opioid) 54 can be introduced into the second compartment 20 but membrane 8 must have enough structural integrity so that the liquid narcotic (opioid) 54 cannot be inadvertently introduced into the second compartment 20 or the liquid narcotic (opioid) deactivation compound 22 cannot inadvertently leak out of the second compartment 20.

A further unique aspect of the present invention is the use of liquid narcotic (opioid) validation strips or indicators 12. Preferably, liquid narcotic (opioid) validation strips or indicators 12 are conventional litmus test strips. However, it is to be understood that liquid narcotic (opioid) validation strips or indicators 12 can be any suitable liquid narcotic (opioid) validation strips or indicators that are capable of quickly, easily, and accurately providing an indication as to the chemical composition of the liquid material 54 that has been introduced into the first compartment 4.

Liquid narcotic (opioid) validation strips or indicators 12 are conventionally attached to the interior of compartments container 6 in first compartment 4. In particular, liquid narcotic (opioid) validation strips or indicators 12 are located adjacent to membrane 8 and extend towards one-way valve (or seal) 7 along a section of first compartment 4. It is to be understood that liquid narcotic (opioid) validation strips or indicators 12 should extend a distance along the length of first compartment 4 so that the end user can quickly and easily determine the nature (chemical composition) of the liquid material 54 that was introduced into the first compartment 4 and validate that the liquid material 54 (FIG. 3) that was introduced into the first compartment 4 was, in fact, the same liquid material that was supposed to be wasted, as discussed above. For example, if the liquid narcotic (opioid) to be wasted is supposed to be propofol and the liquid narcotic (opioid) validation strips or indicators 12 show that the liquid material 54 that was introduced into the first compartment 4 is, in fact, propofol, then the liquid material 54 is subsequently introduced into the second compartment 20 so that the liquid material 54 can be deactivated. However, if the liquid narcotic (opioid) validation strips or indicators 12 show that the liquid material 54 that was introduced into the first compartment 4 is not, in fact, propofol, then the proper authorities are notified and the required procedural, personnel and/or legal actions will be taken.

A still further unique aspect of the present invention is the use of second compartment 20. As discussed earlier, the second compartment 20 is used to deactivate the liquid material 54 (FIG. 4) that was introduced into the first compartment 4 if the liquid material that was introduced into the first compartment 4 is, in fact, the liquid narcotic (opioid) that is to be wasted. Located within the second compartment 20 is a conventional liquid narcotic (opioid) deactivation compound 22 which deactivates the liquid narcotic (opioid), thereby rendering the liquid material 54 inert such as Deterra®, manufactured by Verde Technologies. In this manner, once the liquid narcotic (opioid) 54 has been introduced into the second compartment 20 (FIG. 4), the end user can simply shake or otherwise agitate the compartments container 6 so that the liquid narcotic (opiod) 54 (FIG. 4) completely interacts with the liquid narcotic (opioid) deactivation compound 22 so that the liquid narcotic (opioid) is rendered inert and cannot be separated out or otherwise removed from the liquid narcotic (opioid) deactivation compound 22, as is well known in the liquid narcotic (opioid) deactivation compound art. It is to be further understood that there should be a sufficient amount of liquid narcotic (opioid) deactivation compound 22 located within the second compartment 20 so that the liquid narcotic (opioid) deactivation compound 22 will be able to render inert any liquid narcotic (opioid) 54 that is introduced into the second compartment 20.

Construction of the Liould Narcotic (Opioid) Validation and Deactivation Device

In order to construct liquid narcotic (opioid) validation and deactivation device 3, a predetermined amount of liquid narcotic (opioid) deactivation compound 22 is conventionally placed in the bottom of compartments container 6. The membrane 8 is then conventionally attached to the inside of compartments container 6 in order to create second compartment 20. It is to be understood that conventional markings or graduations 10 can be conventionally attached to or formed on the inside or outside of compartments container 6 prior to the attachment of the membrane 8 to the inside of compartments container 6. In this manner, the one end of conventional markings or graduations 10 can be used as a guide to show where membrane 8 should be placed in compartments container 6. It is to be further understood that compartments container 6 should be conventionally cleaned and sanitized prior to the attachment of membrane 8 so that the compartments container 6 does not contain any materials that could adversely affect the validation and/or deactivation process of the liquid narcotic (opioid) validation and deactivation device 3.

After the membrane 8 has been attached to the inside of compartments container 6, the inside of the first compartment 4 can be again conventionally cleaned and sanitized so that the compartments container 6 does not contain any materials that could adversely affect the validation process of the liquid narcotic (opioid) validation and deactivation device 3. Once the first compartment 4 has been cleaned, the liquid narcotic (opioid) validation strips or indicators 12 are then conventionally secured to the inside of compartments container 6 in the area adjacent to the membrane 8 in first compartment 4.

After the liquid narcotic (opioid) validation strips or indicators 12 have been attached in the first compartment 4, the liquid narcotic (opioid) validation and deactivation device 3 is then inspected to ensure that the first compartment 4 and the second compartment 20 do not have any visible contaminants. If no visible contaminants are found, the one-way valve (or seal) 7 is then conventionally attached to the end of compartments container 6.

Operation of the Liquid Narcotic (Opiod) Validation and Deactivation System

Once the medical or surgical procedure has been completed and it is determined that there is at least one container of liquid narcotic (opioid) that has liquid narcotic that must be wasted after the conclusion of a medical or surgical procedure, the two (2) medical personnel who are authorized to waste the remaining liquid narcotic (opioid) will take the container of remaining liquid narcotic (opioid) to a dedicated station in which the remaining liquid narcotic (opioid) to be wasted will be validated and, possibly, deactivated.

In particular, a conventional syringe 50 having a conventional needle (not shown) will be used to conventionally extract a portion of the liquid narcotic (opioid) 54 (FIG. 2) to be wasted from the container of the remaining liquid narcotic (opioid) to be wasted. However, it is to be understood that the syringe 50 may also be used to conventionally extract a portion of the liquid narcotic (opioid) 54 (FIG. 2) to be wasted from the container of the remaining liquid narcotic (opioid) to be wasted without the use of a needle. The end user then notes the amount of liquid narcotic (opioid) 54 (FIG. 2) to be wasted that was introduced into the syringe 50

One end of syringe 50 will then be inserted into the one-way valve (or seal) 7 so that a portion of syringe 50 extends into or otherwise enters into one-way valve (or seal) 7 and extends into a portion of the first compartment 4. The liquid narcotic (opioid) 54 will then be conventionally introduced into the first compartment 4 by a conventional pushing action of the end user on the syringe 50 (FIG. 2).

After the liquid narcotic (opioid) 54 has been introduced into the first compartment 4, the syringe 50 is withdrawn from the one-way valve (or seal) 7 (FIG. 3). As discussed above, the one-way valve (or seal) 7 prevents withdrawal of the liquid narcotic 54 from first compartment 4 after it has been transferred to the first compartment 4.

After the liquid narcotic (opioid) 54 has been introduced into the first compartment 4 and the syringe 50 has been removed from the one-way valve (or seal) 7, the end user uses the markings or graduations 10 to determine the amount of liquid narcotic (opioid) 54 that was introduced into the first compartment 4. The end user can then compare the amount of liquid narcotic (opioid) 54 that was introduced into the first compartment 4 to the amount of liquid narcotic (opioid) 54 that was injected out of the syringe 50 (FIG. 1) into the first compartment 4. In this manner, the end user can determine if any of the liquid narcotic (opioid) 54 that should have been introduced into the first compartment 4 was actually introduced into the first compartment 4 and did not leak out around the one-way valve (or seal) 7.

Once the liquid narcotic (opioid) 54 has been introduced into the first compartment, the end user will then mix or agitate, if necessary, the liquid narcotic (opioid) validation and deactivation device 3 so that the liquid narcotic (opioid) 54 contained within the first compartment 4 will properly interact with the liquid narcotic (opioid) validation strips or indicators 12 (FIG. 3). The end user (in this case, the two (2) medical personnel who are authorized to waste the remaining liquid narcotic (opioid)) will then read or otherwise observe the liquid narcotic (opioid) validation strips or indicators 12 to determine if the remaining liquid narcotic 54 (the liquid narcotic to be wasted) that was to be wasted was, in fact, the liquid narcotic medication that should have been wasted.

If the end user determines that the liquid narcotic (opioid) 54 contained in the first compartment 4 was, in fact, the liquid narcotic (opioid) that should have been wasted, then the liquid narcotic (opioid) is then transferred to the second compartment 20 (FIG. 4) where the liquid narcotic (opioid) is then conventionally deactivated and rendered inert, as discussed above.

On the other hand, if the end user determines that the liquid material 54 in the first compartment 4 is not the liquid narcotic (opioid) that was to be wasted, the remaining liquid in the container used during the surgical procedure and the remaining material 54 in the syringe 50 that was to be wasted will be held for further investigation and tested by the pharmacy or lab to determine the discrepancy.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein is a new and improved apparatus and method for the validation and deactivation of liquid narcotic medications, which according to various embodiments of the present invention, offers the following advantages: ease of use; lightness in weight; portability; reliability; repeatability of the validation process; ease of proper disposal of the device; the ability to test (validate) a sample of the type of liquid narcotic medication that was to be wasted; the ability to determine the chemical composition of the sample of the type of liquid narcotic medication that was to be wasted; the ability to deactivate the tested sample; and the ability to inform the proper authorities as to the chemical composition of the sample of the type of liquid narcotic medication that was to be wasted. In fact, in many of the preferred embodiments, these advantages of ease of use, lightness in weight, portability, reliability, repeatability of the validation process, ease of proper disposal of the device, the ability to test (validate) a sample of the type of liquid narcotic medication that was to be wasted, the ability to determine the chemical composition of the sample of the type of liquid narcotic medication that was to be wasted, the ability to deactivate the tested sample, and the ability to inform the proper authorities as to the chemical composition of the sample of the type of liquid narcotic medication that was to be wasted are optimized to an extent that is considerably higher than heretofore achieved in prior, known methods and apparatus for the deactivation of liquid narcotic medications.

I claim:

1. A method for validating and deactivating liquid medications to be wasted, comprising the steps of:

providing a liquid medication validation and deactivation device, wherein the liquid medication validation and deactivation device comprises:
  a liquid medication validation and deactivation container having a first end and a second end;
  a rupturable membrane attached to an inside of the liquid medication validation and deactivation container;
  a liquid medication deactivation compartment located within the liquid medication validation and deactivation container such that the liquid medication deactivation compartment is located between the first end of the liquid validation and deactivation container and a first side of the membrane;
  a liquid medication validation compartment located within the liquid medication validation and deactivation container such that the liquid medication validation compartment is located between the second end of the liquid validation and deactivation container and a second side of the membrane;
  at least one liquid medication indicator located within the liquid medication validation compartment, wherein the at least one liquid medication indicator is used to determine a chemical compound of a liquid medication that is introduced into the liquid medication validation compartment; and
  a one-way valve operatively connected to the second end of the liquid medication validation and deactivation container;
introducing an amount of a liquid medication to be wasted through the one-way valve into the liquid medication validation compartment, wherein the liquid medication to be wasted includes a known chemical composition;
validating a chemical composition of the liquid medication to be wasted in the liquid medication validation compartment, wherein 1.) if it is determined that the liquid medication that was validated in the liquid medication validation compartment has the same chemical composition as the known composition of the liquid medication to be wasted then the liquid medication that was validated in the liquid medication validation compartment is transferred through the membrane to the liquid medication deactivation compartment where the liquid medication to be wasted is deactivated by rendering the liquid medication inert or 2.) if it is determined that the liquid medication that was validated in the liquid medication validation compartment does not have the same chemical composition as the known composition of the liquid medication to be wasted then the liquid medication that was validated in the liquid medication validation compartment is retained in the liquid medication validation compartment for further investigation to determine the discrepancy between the chemical composition of the liquid medication that was validated in the liquid medication validation compartment and the known composition of the liquid medication to be wasted.

2. The method for validating and deactivating liquid medications to be wasted, according to claim 1, wherein the step of providing a liquid medication validation and deactivation device is further comprised of the step of:
  providing a rupturable, UV resistant, and chemical resistant material.

3. The method for validating and deactivating liquid medications to be wasted, according to claim 1, wherein the step of providing a liquid medication validation and deactivation device is further comprised of the step of:
  providing an amount of a liquid medication deactivation compound in the liquid medication deactivation compartment which is capable of deactivating the liquid medication thereby rendering the liquid medication inert.

4. The method for validating and deactivating liquid medications to be wasted, according to claim 1, wherein the step of providing a liquid medication validation and deactivation device is further comprised of the step of:
  providing a plurality of markings located along a length of the liquid medication validation and deactivation container and along the liquid medication validation compartment to provide an indication as to the amount of liquid medication that has been introduced into the liquid medication validation compartment.

5. The method for validating and deactivating liquid medications to be wasted, according to claim 1, wherein the step of providing a liquid medication validation and deactivation device is further comprised of the step of:
  providing a syringe such that the syringe contains an amount of a liquid medication to be validated and deactivated, wherein the syringe is used to introduce the liquid medication into the liquid medication validation compartment through the one-way valve.

6. The method for validating and deactivating liquid medications to be wasted, according to claim 1, wherein the one-way valve is further comprised of:
  providing a one-way luer valve.

7. The method for validating and deactivating liquid medications to be wasted, according to claim 1, wherein the at least one liquid medication indicator is further comprised of:
  a litmus strip.

* * * * *